United States Patent
Polishchuk

(10) Patent No.: US 8,198,595 B2
(45) Date of Patent: Jun. 12, 2012

(54) PERSONAL DOSIMETER ON THE BASE OF RADIATION INTEGRATED CIRCUIT

(75) Inventor: Volodymyr Polishchuk, Kiev (UA)

(73) Assignee: Fr. Oleg Uryupin, Mann's Mountain, N.B. (CA)

( * ) Notice: Subject to any disclaimer, the term of this patent is extended or adjusted under 35 U.S.C. 154(b) by 36 days.

(21) Appl. No.: 12/799,287

(22) Filed: Apr. 22, 2010

(65) Prior Publication Data

US 2011/0260070 A1    Oct. 27, 2011

(51) Int. Cl.
*G01T 1/02*    (2006.01)
(52) U.S. Cl. .................................. 250/370.07
(58) Field of Classification Search .............. 250/370.01, 250/370.07, 390.03
See application file for complete search history.

(56) References Cited

U.S. PATENT DOCUMENTS

| | | | | |
|---|---|---|---|---|
| 4,678,916 | A * | 7/1987 | Thomson | 250/370.07 |
| 6,172,368 | B1 * | 1/2001 | Tarr et al. | 250/370.07 |
| 2010/0096556 | A1 * | 4/2010 | Arsalan et al. | 250/370.07 |

FOREIGN PATENT DOCUMENTS

CA        1204885        5/1986

OTHER PUBLICATIONS

B. O'Connell; A. Kelleher; W. Lane; L. Adams: Stacked RADFETs for Increased Radiation Sensitivity. IEEE Transaction on Nuclear Science, vol. 43, No. 3, Jun. 1996 pp. 985-990.
G. Sarrabayrouse; V. Polishchuk: MOS Ionizing Radiation Dosimeters: From Low to High Dose Measurement : Radiation Physics and Chemistry, vol. 61, 2001, 1 Page.
G. Sarrabayrouse; D. Buchdahl; V. Polishchuk; S. Siskos: Stacked-MOS Ionizing Radiation Dosimeters:Potentials and Limitations Radiation Physics and Chemistry, vol. 71 , 2003, 1 Page.
R. H. Crawford; MOSFET in Circuit Design; New York, McGraw Hill Book Company, 1967. 159 Pages.

* cited by examiner

*Primary Examiner* — David Porta
*Assistant Examiner* — Marcus Taningco
(74) *Attorney, Agent, or Firm* — Mario Theriault

(57) ABSTRACT

This invention provides a radiation dosimeter and new method of operation which comprise two types of the metal-oxide-semiconductor field-effect transistor (MOSFET) circuits allowing to amplify the threshold voltage changes due to radiation and provide temperature compensation. The first type dosimeter is a radiation integrated circuit (RADIC) which includes two radiation field-effect transistors (RADFET) and two MOSFETs, integrated into the same substrate. The second type of radiation circuit includes two RADFETs, integrated into the same substrate, and two resistors. The amplification of the threshold voltage change is achieved by using amplification principles of an MOSFET inverter. In both cases, under the ionizing irradiation, the gate of first RADFET is forward biased and the gate of second RADFET is biased off. In the reading mode the amplified differential threshold voltage change is measured. The increased radiation sensitivity allows to measure of the milli-rad doses. The temperature effect and drift is substantially eliminated. These radiation integrated circuits can be used as a personal dosimeter in the nuclear, industrial and medical fields.

7 Claims, 5 Drawing Sheets

PERSONAL DOSIMETER ON THE BASE OF RADIATION INTEGRATED CIRCUIT

FIELD OF THE INVENTION

This invention relates to a dosimeter for measuring ionizing radiation and particularly to a dosimeter using a Radiation Integrated Circuit (RADIC) as a sensor. This sensor is based on Metal Oxide Semiconductor Field Effect Transistors (MOSFETs) and Radiation Field Effect Transistors (RADFETs).

BACKGROUND OF THE INVENTION

Conventional personnel dosimeters include instruments such as thermal luminescent devices for example. These devices use a small crystal of $CaF_2$ or LiF for trapping the electrons and holes produced by the ionizing radiation. When heated, light is emitted from the crystal due to the emptying of the traps. This light is then related to the accumulated dose.

In another perspective, metal-oxide semiconductor dosimeters are MOS field-effect transistors with a specially processed gate insulator. The special gate insulator make the MOSFET radiation soft.

A MOSFET dosimeter measures a shift in the threshold voltage of a radiation field-effect transistor RADFET caused by radiation.

Canadian Pat. No. 1,204,885 which issued May 20, 1986 to Ian Thomson discloses a radiation dosimeter comprising a pair of silicon insulated gate field effect transistors (IGFET). This dosimeter operates by measuring the differential threshold between two IGFET sensors exposed to the same radiation, in which one is biased into its conducting region, and the other is biased either off or to a conducting level less than the first one. These dual IGFET dosimeters offer a sensitivity about 2 mV/cGy in the case where the gate bias is equal to 3 volts, or about 5 mV/cGy in the case where the gate voltage is greater than 10 volts. The temperature sensitivity of the dual IGFET sensor has been found to be smaller than 0.1 mV/° C. Over the temperature range of −20° C. to +50° C., a 70° C. difference, (such as in military applications) a $\Delta V_T$=7 mV or 1-3 cGy has been found.

The problem associated with this prior art device is that it is not sensitive enough for use by workers in the medical, nuclear and industrial fields, wherein a sensitivity of approximately 0.010 cGy (Rad) is required.

B. O'Connell, A. Kelleher, W. Lane, L. Adams in a paper entitled <<Stacked RADFETs for Increased Radiation Sensitivity>> published in IEEE Tran. Nucl. Sci. Vol. 43, N3, June 1996 have demonstrated a radiation sensitivity of 80 mV/cGy by stacking 15 individual RADFETs on the same chip.

V. Polischuk and G. Sarrabayrouse in a paper entitled <<MOS ionizing radiation dosimeters: from low to high dose measurement>> published in the revue of Radiation Physics and Chemistry, Vol. 61, No 3-6, 2001 presented a stack-connected RADFET configuration with RADFETs having a very thick gate oxide of 1.6 μm. In order to increase the sensitivity and the minimum measurable dose, up to 14 transistors have been stacked. The output voltage before irradiation was 18V. A sensitivity as high as 90 mV/cGy has been obtained.

Both teams experimenting with RADFETs claimed a possibility to measure milli-Rad doses. However, stacked RADFETs exhibit a number of problems which limit their use as personal dosimeters. The problem is that each RADFET has a certain temperature coefficient. The metal oxide semiconductor field-effect transistor device has a temperature threshold voltage dependence that needs to be accounted for in order that only radiation induced shift in threshold voltage is measured by the dosimeter. For stacked RADFETs the temperature sensitivity increases by a factor that is more than N times the sensitivity of a single one wherein N is the number of RADFETs in the stack.

G. Sarrabayrouse, D. Buchdahl, V. Polischuk, S. Siskos in a paper entitled <<Stacked MOS ionizing radiation dosimeters: potentials and limitations>> published in Radiation Physics and Chemistry, Vol. 71, 2003, pp. 737-739 have proposed to reduce temperature sensitivity of stacked RADFETs by measuring stacked RADFETs at the Minimum Temperature Coefficient (MTC) point. Indeed this paper presents only the computer simulations. The temperature sensitivity at MTC point and threshold voltage drifts were not measured.

Another problem associated with stacked RADFET resides in its high output voltage which in some cases is about 18 volts. Therefore it is difficult to amplify the small changes of threshold voltages, caused by radiation, by using operational amplifiers.

SUMMARY OF THE INVENTION

It is therefore an object of the present invention to provide a radiation integrated circuit as a personal dosimeter having a milli-Rad sensitivity and temperature compensation by applying amplification principles of inverters.

In a radiation dosimeter comprising two circuits, each containing a RADFET, the first RADFET in the first circuit, the reference circuit, is biased off during irradiation, and the second RADFET in the second circuit, the inverter circuit, is biased forward. Thus the threshold voltage of the second RADFET varies with the dosage to a considerably greater degree than that of the first RADFET. During measurement, the threshold voltage change of the second RADFET is amplified by its inverter circuit. The output voltage change corresponds to the amplified differential threshold voltage change as expressed as follows:

$$\Delta U_{out} = A_u * \Delta U_T$$

Thus the present invention solves the problems of low radiation sensitivity of conventional dual IGFETs and stacked RADFETs dosimeters.

Another advantage of the present invention is that its radiation integrated circuit has minimum temperature effect and it is relatively insensitive to temperature changes. This is achieved by measuring the differential threshold voltage from two RADFETs. In order to assure that temperature affect both RADFETs equally, the circuits with both RADFETs and both MOSFETs or with two RADFETs were fabricated in the same silicon substrate, i.e. in the same chip. The gate oxide thickness of each RADFET is preferably 1 μm.

The radiation dosimeter according to the present invention is capable of measuring a wide range of ionizing radiation from a very low dose of 0.01 cGy to 2 cGy.

This sensor substantially improves sensitivity in comparison with existing RADFET (or insulated gate field effect transistors (IGFET)) and dual RADFET (or dual IGFET) dosimeters. The improved radiation dosimeter can be applied in any of the fields where radiation dose measurement/dosimetry is needed and where sensitivity and accuracy are crucial (e.g. medical therapy, nuclear industry, power plants, etc.)

BRIEF DESCRIPTION OF THE DRAWINGS

A better understanding of the invention will be obtained by reference to the detailed description of the preferred embodiments of the present invention herein below, and to the following drawings, in which.

DETAILED DESCRIPTION OF THE PREFERRED EMBODIMENTS

Figure 1:
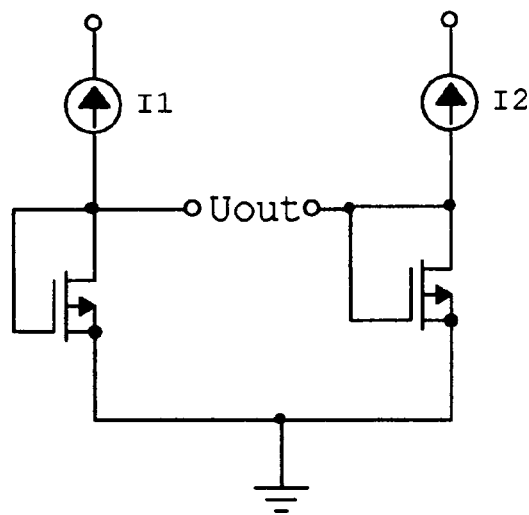
FIG. 1 is a dual IGFET dosimeter of the prior art.
Figure 2:
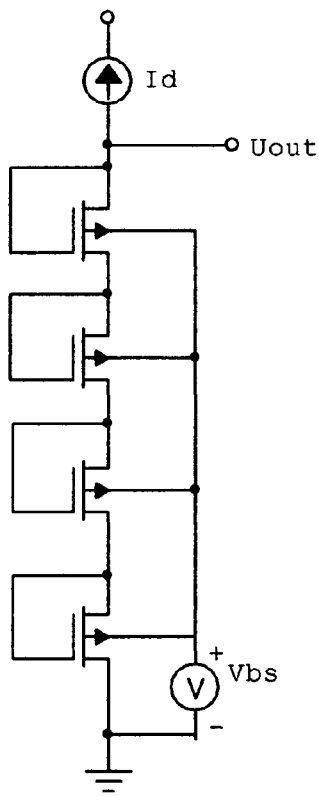
FIG. 2 is a configuration of a stacked RADFET dosimeter of the prior art.
Figure 3:
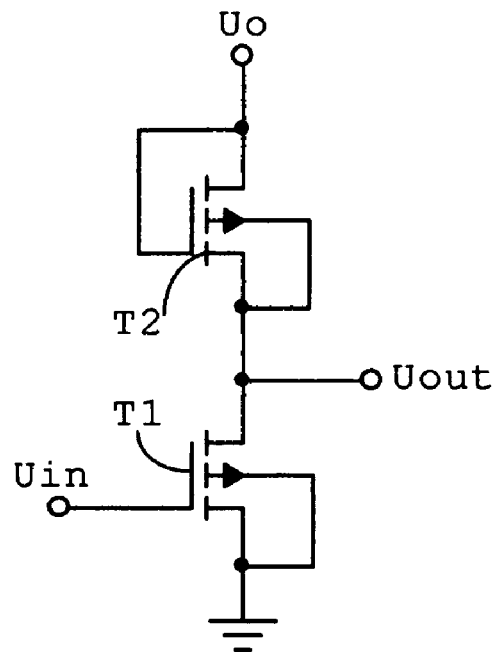
FIG. 3 is an inverter with a MOSFET as a load in an instrument of the prior art.

For reference purposes, FIG. 3 shows an inverter made of two MOSFETs, where T1 is a managing MOSFET transistor and T2 is a loading MOSFET transistor. Amplification coefficient of this inverter is described in a book entitled: "MOS FET in Circuit Design", by R. H. Crawford, New York: McGraw-Hill. 1967. This amplification coefficient is described as follows:

$$\frac{dU_{out}}{dU_{in}} = A_u = -\sqrt{\frac{\beta_1}{\beta_2}} = -\sqrt{\frac{(W/d_{ox}L)_1}{(W/d_{ox}L)_2}}$$

Where β is given as $$\beta = \frac{\mu \varepsilon_o \varepsilon_{ox} W}{d_{ox} L}$$

Figure 4:
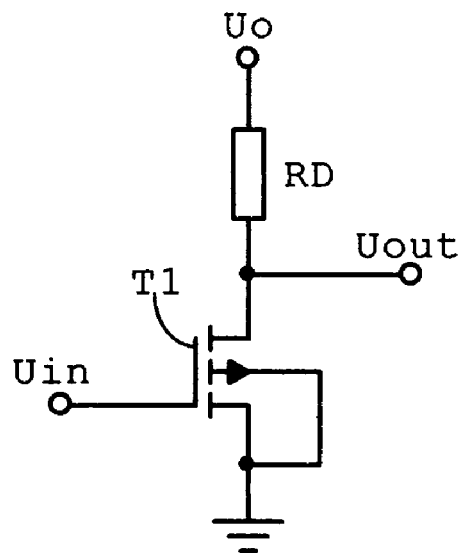
FIG. 4 is an inverter with a resistor as a load in an instrument of the prior art.

Also for reference purposes, FIG. 4 shows an inverter made of a MOSFET and a resistor, where T1 is a managing transistor and R$_D$ is a loading resistor. Amplification coefficient of this second inverter is proportional to steepness or transition conductivity and to the loading resistance:

$$\frac{dU_{out}}{dU_{in}} = A_u = -g_m(R_D \| r_d)$$

Where $(R_D \| r_d)$ is an equivalent resistance of parallel-connected loading resistor R$_D$ and dynamic drain resistance $r_d$.

$$(R_1 \| r_d) = \frac{R_1 * r_d}{(R_1 + r_d)}$$

$$g_m = \sqrt{2|\beta|} * \sqrt{|I_D|}$$

Figure 5:
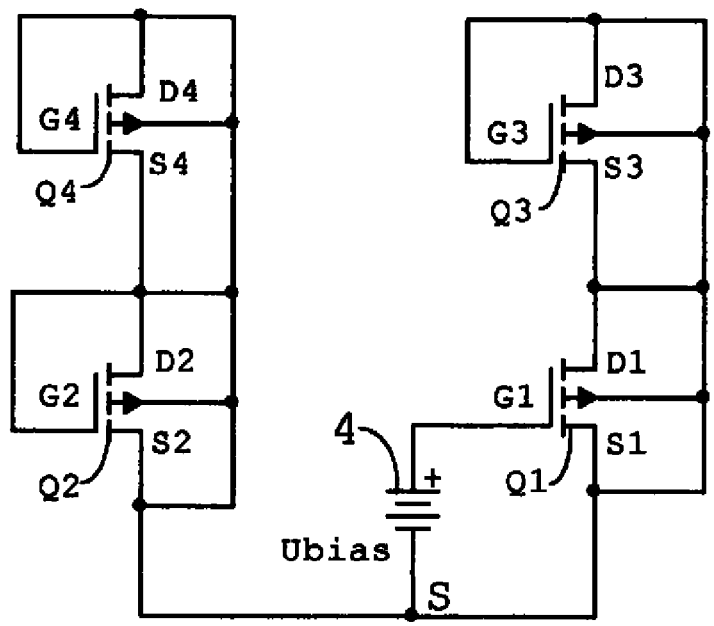
FIG. 5 is a schematic illustration of the radiation integrated circuit according to a first preferred embodiment of the present invention ready to accept irradiation.

FIG. 5 illustrates a first preferred embodiment of the present invention. The RADFET Q2 has its gate G2, drain D2 and source S2 connected together and to the common source S. The RADFET Q1 has its gate G1 biased by the battery 4 and its drain D1 and source S1 are connected to the common source S. Two MOSFETs Q3 and Q4 have their drains D3 and D4, gates G3 and G4, sources S3 and S4 connected to the common source S.

Both RADFETS Q1 and Q2 and both MOSFETs Q3 and Q4 are subjected to the same ionizing radiation. The MOSFETs have oxide thickness less than or equal to 100 nm and the RADFETs have an oxide thickness equal to or greater than 1 μm. Because the radiation sensitivity is proportional to oxide thickness, the MOSFETs have very small sensitivity in comparison with the RADFETs. It has been found that the radiation sensitivity is much greater for the biased RADFET Q1 than unbiased RADFET Q2.

Figure 6:
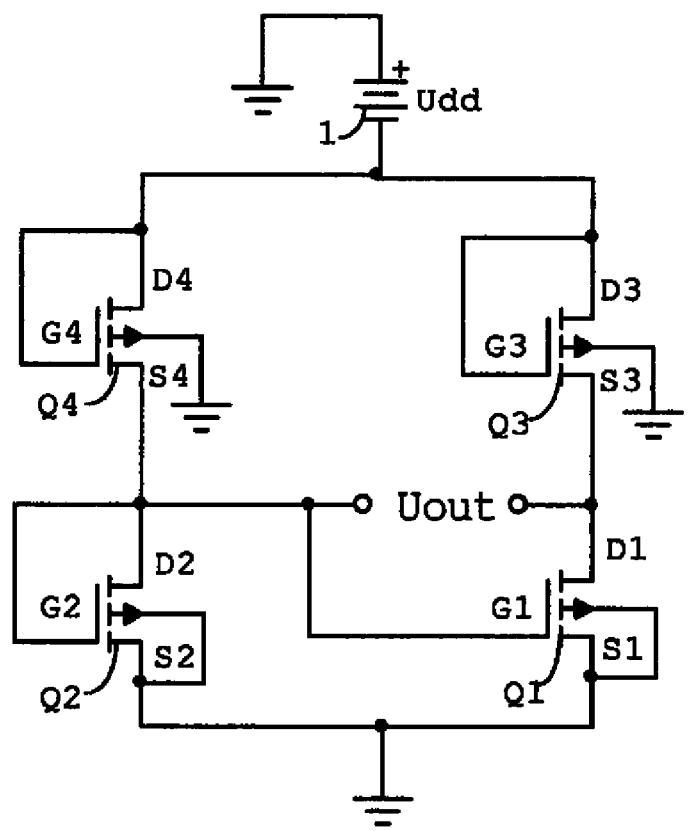
FIG. 6 is a schematic illustration of the radiation integrated circuit dosimeter according to the first preferred embodiment of the present invention in the reading mode.

FIG. 6 illustrates the first embodiment of the present invention in the reading mode. It shows the same RADFETs Q1 and Q2 and the same MOSFETs Q3 and Q4 in a radiation integrated circuit (referred to as RADIC1) ready to measure the radiation dose. The sources S1 and S2 of the RADFETs are connected together and grounded. The gate G2 of RADFET Q2 is connected to its own drain D2 and this drain is connected to the gate G1 of RADFET Q1. The gate G3 and the drain D3 of the MOSFETs Q3 are connected together. The gate G4 and the drain D4 of the MOSFETs Q4 are connected together as well. The source S3 of MOSFET Q3 is connected to the drain D1 of the RADFET Q1 and the source S4 of the MOSFET Q4 is connected to the drain D2 of the RADFET Q2. A power supply U$_{dd}$ is connected to the drains D3 and D4 of both MOSFETs. Both MOSFETs should be the same. Both RADFETs should be the same as well. Both MOSFETs and both RADFETs are fabricated in the same die. Thus both RADFETs should have the same temperature variation characteristics, the same initial threshold voltage and the same oxide charges prior to irradiation. Both MOSFETs should also have the same temperature characteristics and the same threshold voltage. The RADFET Q1 and MOSFET Q3 constitute the inverter which can amplify the threshold voltage change of RADFET Q1. The amplification of threshold voltage change is given by the following equation:

$$A_u = -\sqrt{\frac{(W/d_{ox}L)_{RADFET}}{(W/d_{ox}L)_{MOSFET}}}$$

In one example wherein the RADFET parameters are; W1=1200 μm, L1=50 μm and dox=1 μm and the MOSFET parameters are as W2=20 μm, L2=2400 μm and dox=0.1 μm, the threshold voltage amplification is 17.

The output voltage U$_{out}$ is measured between the drains D1 and D2 of the RADFETs. Prior to irradiation, the voltage U$_{out}$ is measured as a first amplified differential threshold. After irradiation the output voltage U$_{out}$ is measured again. The output voltage change ΔU$_{out}$ is equal to the difference between the output voltages before and after irradiation or to the amplified differential threshold voltage ΔU$_T$ due to the dosage received:

$$\Delta U_{out} = A_u * \Delta U_T$$

The RADFET Q2 and MOSFET Q4 constitute the reference circuit. This circuit has the same temperature and drift characteristics as the inverter. Thus the temperature effect of this radiation integrated circuit is eliminated.

Figure 7:
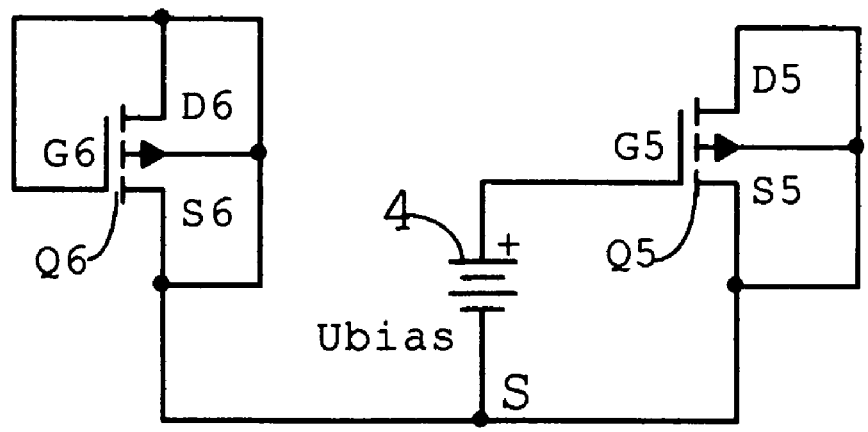
FIG. 7 is a schematic illustration of the radiation circuit according to the second preferred embodiment of the present invention ready to accept irradiation.

FIG. 7 illustrates the second preferred embodiment of the present invention. The RADFET Q6 has its gate G6, drain D6 and source S6 connected together and to the common source S. The RADFET Q5 has its gate G5 biased by the battery 4 and its drain D5 and source S5 connected to the common source S.

Both RADFETs Q5 and Q6 are subjected to the same ionizing radiation. These RADFETs have oxide thickness equal to or more than 1 μm. During irradiation RADFET Q5 is biased by the battery 4 and RADFET Q6 is biased off. Thus RADFET Q5 has considerably higher radiation sensitivity than RADFET Q6.

Figure 8:
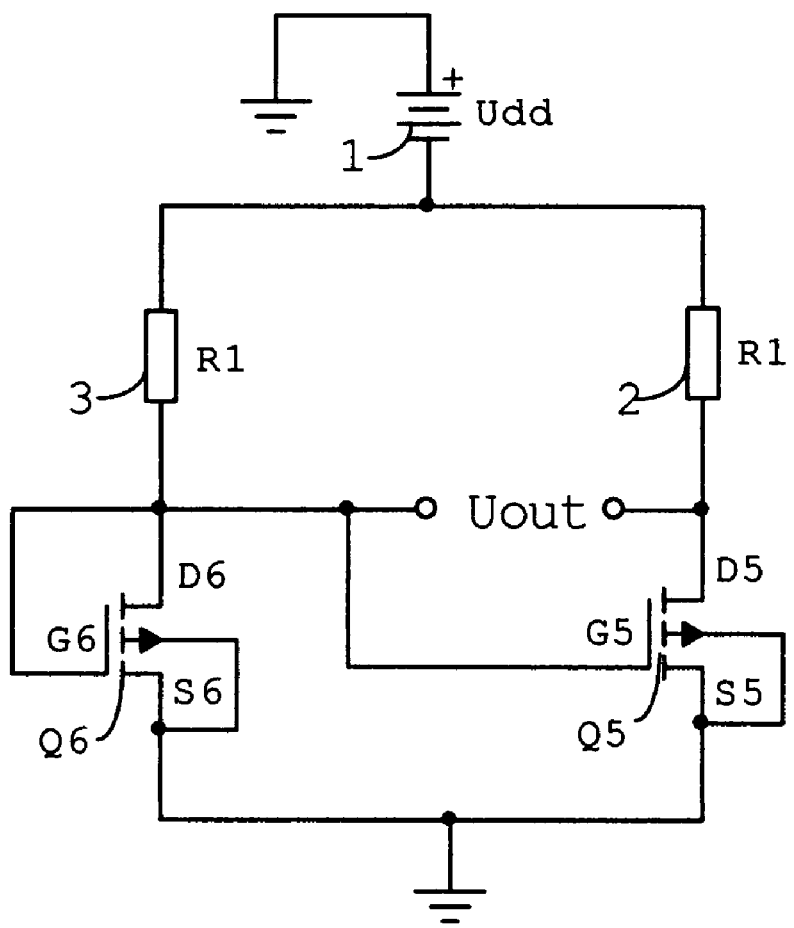
FIG. 8 is a schematic illustration of the radiation circuit dosimeter according to the second preferred embodiment of the present invention in the reading mode.

FIG. 8 illustrates the second preferred embodiment of the present invention in the reading mode. FIG. 8 illustrates the same RADFETs Q5 and Q6 and the same resistors 2 and 3 in the radiation integrated circuit 2 (referred to as RADIC2) ready to measure a radiation dose. The sources S5 and S6 of the RADFETs are connected together and grounded. The gate G6 of RADFET Q6 is connected to its own drain D6 and this drain is connected to the gate G5 of RADFET Q5. The resistor 2 is connected to the drain D5 of the RADFET Q5 and the resistor 3 is connected to the drain D6 of the RADFET Q6. A power supply U is connected to both resistors 2 and 3.

Both RADFETs Q5 and Q6 should be the same and are fabricated in the same die. Thus both RADFETs should have the same temperature variation characteristics, the same initial threshold voltage and the same oxide charges prior to irradiation. The RADFET Q5 and resistor 2 constitute the inverter which can amplify the threshold voltage change of RADFET Q5. The amplification of threshold voltage change of RADFET Q5 is given by the following equation:

$$A_u = -\sqrt{\left(\frac{\mu \varepsilon_o \varepsilon_{ox} W}{d_{ox} L}\right) RADFET} * \sqrt{|I_D|} * (R_1 \| r_d)$$

In the example wherein the RADFETs parameters are; W=4000 μm, L=40 μm and R1=1000 kΩ the amplification of threshold voltage change of the inverter is 15.

The RADFET Q6 and resistor 3 constitute the reference circuit for the inverter and it has the same temperature and drift characteristics as the inverter. Thus the temperature effect of this radiation circuit is minimized. The measured temperature sensitivity of RADIC2 is 0.5 mV/° C.

The output voltage change $\Delta U_{out}$ is equal to the amplified differential threshold voltage $\Delta U_T$ due to the dosage received.

The radiation sensitivity of this radiation circuit (S=$\Delta U_{out}$/D) is 240 mV/cGy for the case of biased voltage during irradiation Ubias=3.3V. Taking into account the measured temperature sensitivity the minimum measured dose is about 0.01 cGy or 10 mRad when temperature is controlled within ±1° C.

Figure 9:
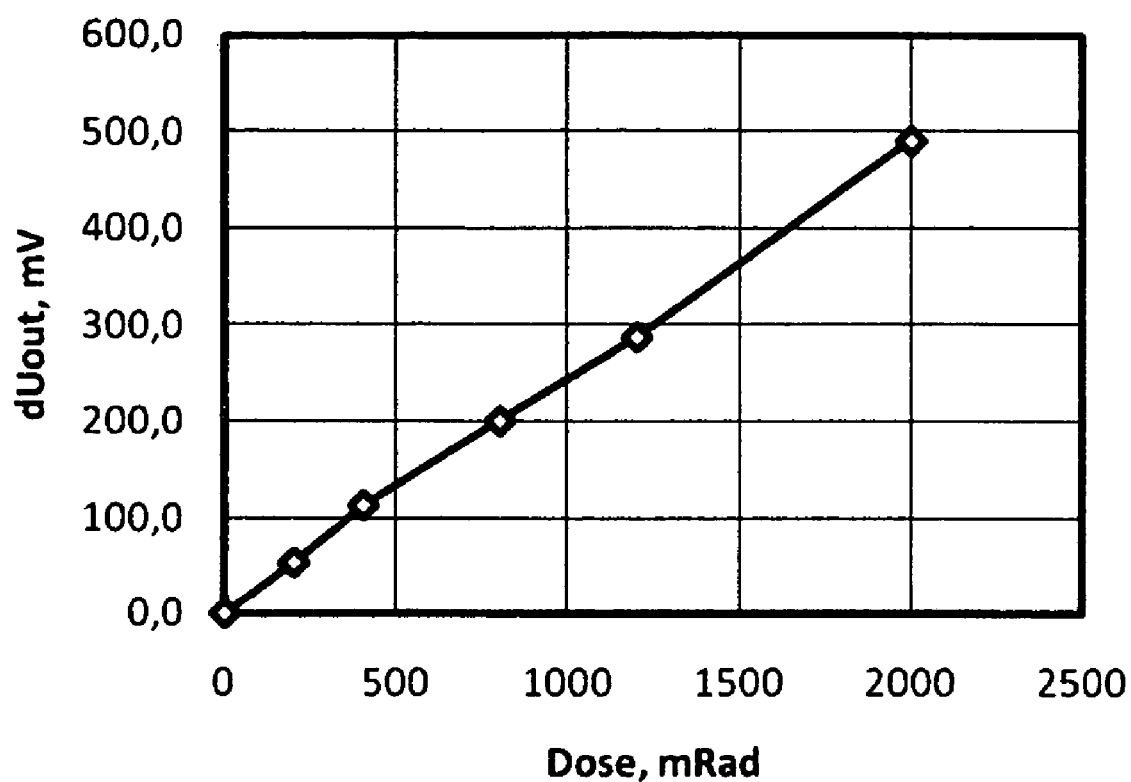
FIG. 9 shows the response of the radiation circuit as a function of the radiation dose of gamma-ray for the second preferred embodiment of the present invention.

FIG. 9 shows the experimental output voltage changes as a function of the irradiation dose of gamma-rays for radiation integrated circuit (RADIC2).

Thus it may be understood that the radiation integrated circuits (RADIC1 and RADIC2) of the present invention provide a more sensitive and accurate dosimeter circuit than the prior art dual IGFET dosimeter or stacked-connected RADFETs dosimeter.

What is claimed is:

1. A radiation dosimeter comprising a pair of radiation field effect transistors with thick oxide, each having a gate, a source, and a drain, and a pair of metal oxide field effect transistors, with thin oxide, each having a gate, a source, and a drain, all transistors integrated into the same substrate, means for applying a voltage to drain of each MOSFETs, means for forward biasing of the gate of second RADFET and zero biasing the gate of the first RADFET under the influence of ionizing radiation, means for measuring the amplified differential threshold voltage of radiation integrated circuit.

2. A dosimeter as defined in claim 1, means for connecting the drain with the gate of first MOSFET and the drain with the gate of the second MOSFET, means for connecting the drain of the first MOSFET and the drain of the second MOSFET with voltage supply, means for connecting the gate with the drain of the first RADFET, means for connecting the drain of the first RADFET with the gate of the second RADFET, means for connecting the source of the first MOSFET with drain of the first RADFET and the source of second MOSFET with the drain of second RADFET, means for reading amplified threshold difference between the drains of RADFETs to obtain an initial amplified differential threshold of voltage corresponding to accumulated radiation dose before irradiation.

3. A dosimeter as defined in claim 1 or 2 in which the RADFETs and MOSFETs have aluminium gates or polysilicon gates.

4. A dosimeter as defined in claim 1 in which RADFETs have oxide thickness equal to or greater than about 0.5 μm.

5. The dosimeter as defined in claim 1 in which the radiation integrated circuits have amplification of differential threshold voltage change as function of MOSFET, RADFET and resistor parameters.

6. A method of measuring ionizing radiation dosage comprising:
 (1) measurement of an initial amplified differential threshold voltage of a radiation integrated circuit comprising two RADFETs and two MOSFETs;
 (2) forward biasing the gate of second RADFET and zero biasing of the first RADFET while said two RADFETs are exposed to ionizing radiation;
 (3) measurement of the amplified differential threshold voltage between said two RADFETs after irradiation; and
 (4) subtracting of the amplified differential threshold voltage measured after irradiation from that measured before irradiation.

7. A method of measuring ionizing radiation dosage comprising:
 (1) measurement of an initial amplified differential threshold voltage of a radiation integrated circuit comprising two RADFETs and two resistances;
 (2) forward biasing the gate of second RADFET and zero biasing of the first RADFET while said two RADFETs are exposed to ionizing radiation;
 (3) measurement of the amplified differential threshold voltage between said two RADFETs after irradiation; and
 (4) subtracting of the amplified differential threshold voltage measured after irradiation from that measured before irradiation.

* * * * *